March 1, 1932.　　　　　H. S. TAYLOR　　　　　1,847,635
AUTOMOBILE REAR VIEW MIRROR
Filed Feb. 16, 1927
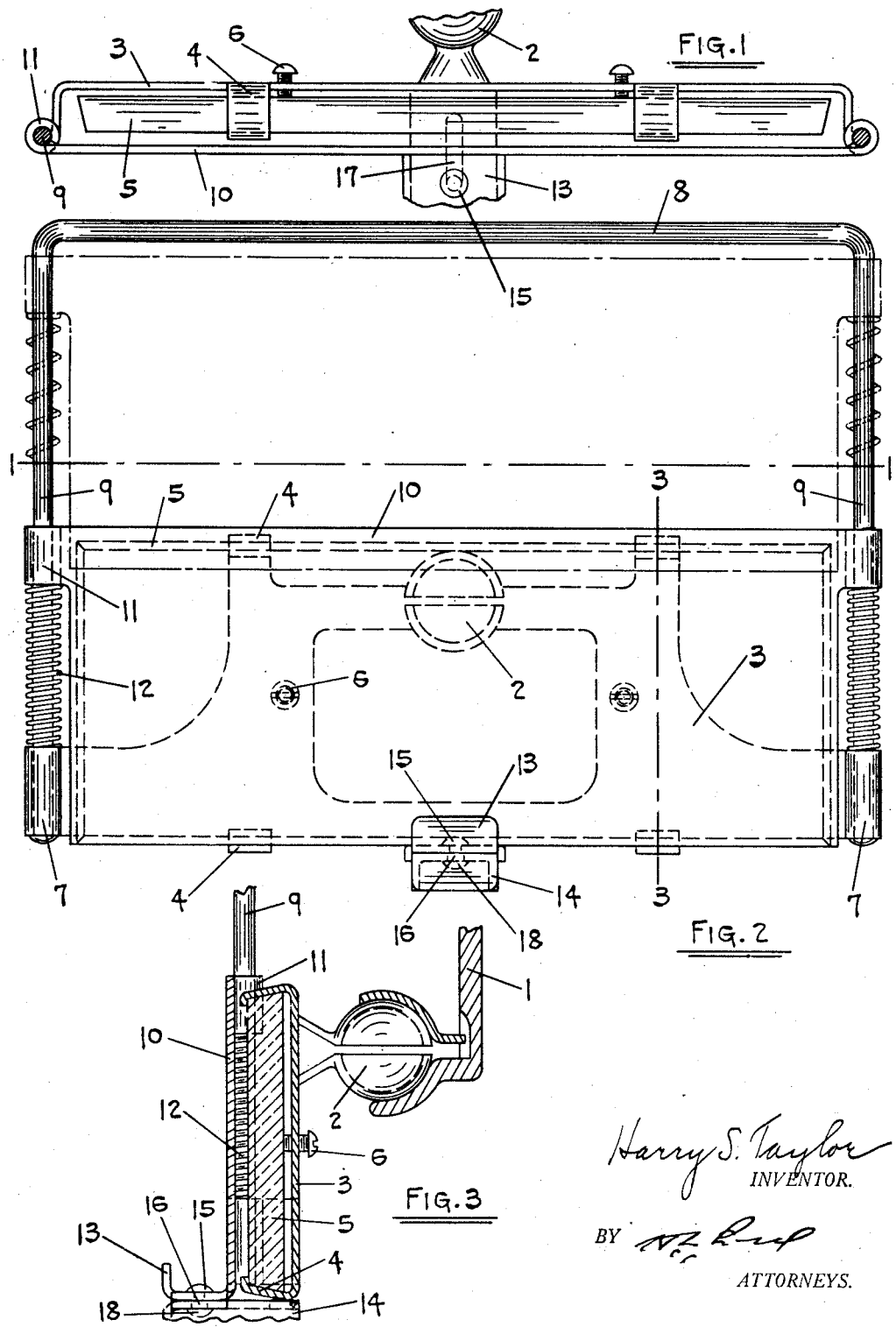
Harry S. Taylor
INVENTOR.
BY
ATTORNEYS.

Patented Mar. 1, 1932

1,847,635

UNITED STATES PATENT OFFICE

HARRY S. TAYLOR, OF ERIE, PENNSYLVANIA

AUTOMOBILE REAR VIEW MIRROR

Application filed February 16, 1927. Serial No. 168,750.

Automobile rear view mirrors give trouble through the glare from the lights of a following automobile being deflected into the eyes of the operator. This is not only annoying but in some instances dangerous. The present invention is designed to obviate this trouble.

A preferred embodiment of the invention is illustrated in the accompanying drawings as follows:—

Fig. 1 shows a section on the line 1—1 in Fig. 2.

Fig. 2 an elevation of the device.

Fig. 3 a section on the line 3—3 in Fig. 2.

1 marks a supporting bracket which forms a means for securing it in position on the automobile body, and 2 a ball connection between the bracket and a frame 3 by means of which the device is adjustably mounted. The frame 3 has the inturned clips 4. A mirror plate 5 is secured within the clips, screws 6 putting pressure on the plate to hold the mirror tightly in place. The frame has ears 7 which are rolled to form a sleeve. A cross bar 8 has downwardly extending guides 9 which are secured in the ears 7.

A shutter 10 has ears 11 which are provided with openings through which the guide rods 9 extend. This forms a sliding mounting for the shutter 10. With the shutter in the lower position on the guides 9 it is over the mirror plate and when in its upper position as shown in dash lines in Fig. 2 it exposes the mirror plate. Springs 12 are arranged around the rods 9 between the ears 7 and 11. These springs normally hold the shutter in the upper position.

A projection 13 is arranged on the bottom of the shutter. A catch 14 is slidingly attached to the bottom of the projection 13 by means of a pin 15. The pin extends through the projection 13 and is provided with a neck 16 which extends through a slot 17 (see dotted lines Fig. 1) and is also provided with a head 18 under the catch 14 which secures the catch on the projection and permits the catch to be moved inwardly to the position shown in Fig. 3 for locking the shutter in its lower position, or to be drawn outwardly so as to clear the plate 5 and permit the springs to move the shutter to its upper position.

What I claim as new is:—

1. In an automobile rear view mirror, the combination with a mirror plate, a frame for the plate, and a shutter, of a mounting secured on the frame on which the shutter is slidably supported and adapted to move over and off the plate; and a spring on the mounting moving the shutter toward one adjustment with relation to the plate.

2. In an automobile rear view mirror, the combination with a mirror plate, a frame for the plate, and a shutter, of perforated ears extending from the frame; vertical guides arranged in the ears; sleeves mounted on the guides supporting the shutter; springs between the ears and sleeves; and a catch adapted to lock the shutter against the tension of the spring over the mirror plate.

In testimony whereof I have hereunto set my hand.

HARRY S. TAYLOR.